United States Patent
Rutherglen et al.

(10) Patent No.: US 10,776,345 B2
(45) Date of Patent: Sep. 15, 2020

(54) EFFICIENTLY UPDATING A SECONDARY INDEX ASSOCIATED WITH A LOG-STRUCTURED MERGE-TREE DATABASE

(71) Applicant: DataStax, Santa Clara, CA (US)

(72) Inventors: Jason John Rutherglen, Las Vegas, NV (US); Ariel David Weisberg, Chelmsford, MA (US)

(73) Assignee: DataStax, Santa Clara, CA (US)

( * ) Notice: Subject to any disclaimer, the term of this patent is extended or adjusted under 35 U.S.C. 154(b) by 168 days.

(21) Appl. No.: 15/962,962

(22) Filed: Apr. 25, 2018

(65) Prior Publication Data

US 2019/0332701 A1    Oct. 31, 2019

(51) Int. Cl.
*G06F 16/22* (2019.01)
*G06F 16/23* (2019.01)
*G06F 16/24* (2019.01)
*G06F 16/245* (2019.01)

(52) U.S. Cl.
CPC ...... *G06F 16/2379* (2019.01); *G06F 16/2246* (2019.01); *G06F 16/245* (2019.01)

(58) Field of Classification Search
CPC .......... G06F 16/2246; G06F 16/2379
See application file for complete search history.

(56) References Cited

U.S. PATENT DOCUMENTS 10,061,693 B2 *  8/2018  Kim ................. G06F 12/0246

OTHER PUBLICATIONS

Fan, Bin et al., "Cuckoo Filter: Practically Better Than Bloom", ACM CoNEXT'14, pp. 75-87 (Year: 2014).*
Alsubaiee, Sattam et al., "LSM-Based Storage and Indexing: An Old Idea With Timely Benefits", ACM GEORICH'15 (Year: 2015).*
Tang, Yuzhe et al., "Deferred Lightweight Indexing for Log-Structured Key-Value Stores", IEEE/ACM CCGrid'15, pp. 11-20. (Year: 2015).*
Ren, Kai et al., "SlimDB: A Space-Efficient Key-Value Storage Engine for Semi-Sorted Data", Proceedings of the VLDB Endowment, vol. 10, No. 13, pp. 2037-2048. (Year: 2017).*

* cited by examiner

*Primary Examiner* — Scott A. Waldron
(74) *Attorney, Agent, or Firm* — Gard & Kaslow LLP

(57) ABSTRACT

Systems and methods are described herein for efficiently updating a secondary index associated with a log-structured merge-tree (LSM) database. A Global approximate member query (AMQ) Filter is queried to determine whether a primary key, retrieved from a list of LSM database updates, already exists in the LSM database. If the primary key does not already exist in the LSM database then read-before-write and delete operations, typically performed with known approaches, do not need to be performed on the secondary index in order to update the secondary index, thereby avoiding significant additional computer processing and input/output operations.

12 Claims, 3 Drawing Sheets

EFFICIENTLY UPDATING A SECONDARY INDEX ASSOCIATED WITH A LOG-STRUCTURED MERGE-TREE DATABASE

FIELD OF THE INVENTION

The present invention relates generally to indexing and searching data, and more particularly to efficiently updating a secondary index used for same.

BACKGROUND OF THE INVENTION

Log-structured merge-tree (LSM) databases are commonly used in online transaction processing (OLTP) systems where high transaction throughput and insert or update-intensive operations are common. Indexes in such systems must be regularly updated to reflect such operations. Unfortunately, a significant amount of time is spent updating the indexes. What is needed, therefore, is a more efficient way to perform such index updates.

SUMMARY OF THE INVENTION

One embodiment is a method for updating a secondary index associated with a log-structured merge-tree (LSM) database, the method comprising: retrieving, by a computing system, a primary key from a list of updates made to the LSM database; querying, by the computing system, a Global Approximate Member Query (AMQ) Filter to determine whether the retrieved primary key does or does not already exist in the LSM database; updating the secondary index with the retrieved primary key without performing a read-before-write operation or a delete operation on the secondary index, if the result of the query is a determination that the retrieved primary key does not already exist in the LSM database; and, updating the secondary index with the retrieved primary key by performing a read-before-write operation and a delete operation on the secondary index, if the result of the query is a determination that the retrieved primary key does already exist in the LSM database.

In a further embodiment of the method, the Global AMQ Filter is a probabilistic filter that supports deletes and can be resized without hashing.

In a still further embodiment of the method, the Global AMQ Filter is a Quotient Filter.

In a yet further embodiment of the method, the Global AMQ Filter is a Cuckoo Filter.

Another embodiment is a non-transitory computer-readable storage medium having embodied thereon a program, the program being executable by a processor to perform a method for storing an index in working memory of a computing system that can concurrently be searched, the method comprising the steps of: retrieving, by a computing system, a primary key from a list of updates made to the LSM database; querying, by the computing system, a Global Approximate Member Query (AMQ) Filter to determine whether the retrieved primary key does or does not already exist in the LSM database; updating the secondary index with the retrieved primary key without performing a read-before-write operation and a delete operation on the secondary index, if the result of the query is a determination that the retrieved primary key does not already exist in the LSM database; and, updating the secondary index with the retrieved primary key by performing a read-before-write operation and a delete operation on the secondary index, if the result of the query is a determination that the retrieved primary key does already exist in the LSM database.

In a further embodiment of the non-transitory computer-readable storage medium having embodied thereon a program, the Global AMQ Filter is a probabilistic filter that supports deletes and can be resized without hashing.

In a still further embodiment of the non-transitory computer-readable storage medium having embodied thereon a program, the Global AMQ Filter is a Quotient Filter.

In a yet further embodiment of the non-transitory computer-readable storage medium having embodied thereon a program, the Global AMQ Filter is a Cuckoo Filter.

Yet another embodiment is a computing system for updating a secondary index associated with a log-structured merge-tree (LSM) database, the computing system comprising: a processor, a Global Approximate Member Query (AMQ) Filter, the LSM database, a list of updates made to the LSM database, and the secondary index; wherein the processor is configured to: retrieve a primary key from a list of updates made to a LSM database; query the Global AMQ Filter to determine whether the retrieved primary key does or does not already exist in the LSM database; update the secondary index with the retrieved primary key without performing a read-before-write operation or a delete operation on the secondary index, if the result of the processor query is a determination that the retrieved primary key does not already exist in the LSM database; and, update the secondary index with the retrieved primary key by performing a read-before-write operation and a delete operation on the secondary index, if the result of the processor query is a determination that the retrieved primary key does already exist in the LSM database.

In a further embodiment of the computing system, the Global AMQ Filter is a probabilistic filter that supports deletes and can be resized without hashing.

In a still further embodiment of the computing system, the Global AMQ Filter is a Quotient Filter.

In a yet further embodiment of the computing system, the Global AMQ Filter is a Cuckoo Filter.

DETAILED DESCRIPTION OF THE INVENTION

A system and method is disclosed for more efficiently updating a secondary index associated with a log-structured merge-tree (LSM) database.

Figure 1:
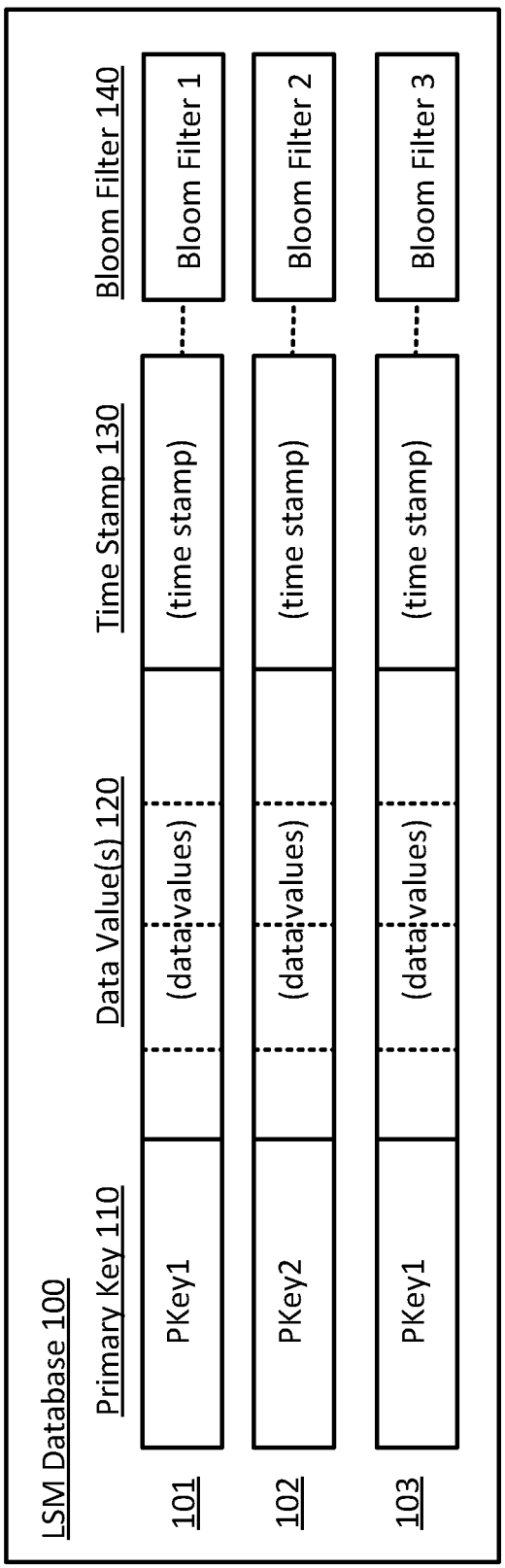
FIG. 1 is an example log-structured merge-tree (LSM) database as may be used in one embodiment of the present approach.

Referring now to FIG. 1, a simplified example of an LSM database is shown (it being understood that such system can be stored and run on any of various known computing systems and storage devices). In this simplified example, LSM database 100 is shown in a tabular or table format where each row, itself comprising a separate data file (portion, section, etc.) in the database, comprises a primary key 110, one more data values 120, and a time stamp 130 indicating when the data file was added to the database.

As is known, updates to an LSM database are made by adding a new data file, rather than editing an existing data file in the LSM database, with the new data file having the same primary key as the existing data file. This is true regardless of whether the purpose of the update is to add new content to (i.e., adding one or more new data values) or to edit content in (i.e., editing one or more existing data values) the existing data file. A process known as compaction later merges into a single data file for long term storage these multiple data files having the same primary key using their respective time stamps to determine the most recent and therefore correct data value(s) between them.

In the example shown in FIG. 1, a first data file with a primary key 110 of "PKey1", one or more primary data values 120, and a time stamp 130, was added to LSM database 100, as shown in row 101. As also shown in this example, a second data file with a primary key 110 of "PKey2", one or more primary data values 120, and a time stamp 130, was added to LSM database 100, as shown in row 102. As also shown in this example, a data file with a primary key 110 of "PKey1", one or more primary data values 120, and a time stamp 130, was added to LSM database 100, as shown in row 103. It is to be noted that the data file of row 103 was an update to the data file of row 101, as indicated by both of them having a primary key 110 of "PKey1" and the data file of row 103 having a later time stamp 130 value (not shown) than the data file of row 101.

Of course, as understood by one of skill in the art, such LSM databases typically contain a significantly larger number of data files (sometimes referred to in the art as Big Data) than in the simplified example shown in FIG. 1. Having a large number of data files, each potentially having a number of different data values, can make searching such a database a time-consuming task. Performing a search based on the primary key 110 can be a relatively simple matter. However, without more, performing a search on one of the data values 120 would require reading each of the data files in the database. To avoid this, as is known, a secondary index is commonly employed.

For example, if an LSM database contained a list of employees in a company, each of whom has a unique employee identification number, a typical database might use the employee identification number as the primary key and the employee name and other information (e.g., department, home address, social security number, etc.) would then be contained in the data values. Then, to do a search of employees by name, each data file would have to be read to locate the desired employee(s). Instead, a secondary index could be constructed with employee last name as a secondary key and employee identification number, which is the primary key in the LSM database, as the corresponding data value in the secondary index (thereby making the secondary index associated with the LSM database). Then a last name search of the secondary index would identify the corresponding employee identification number(s) of the desired employee(s), and the identified employee identification number(s) could then be used to retrieve the relevant data file(s) from the LSM database without having to read each data file in the LSM database. Similarly, as is also known, additional secondary indexes can likewise be constructed with any of the other data values from the LSM database as a secondary key, for searches on those other data values.

Figure 2:
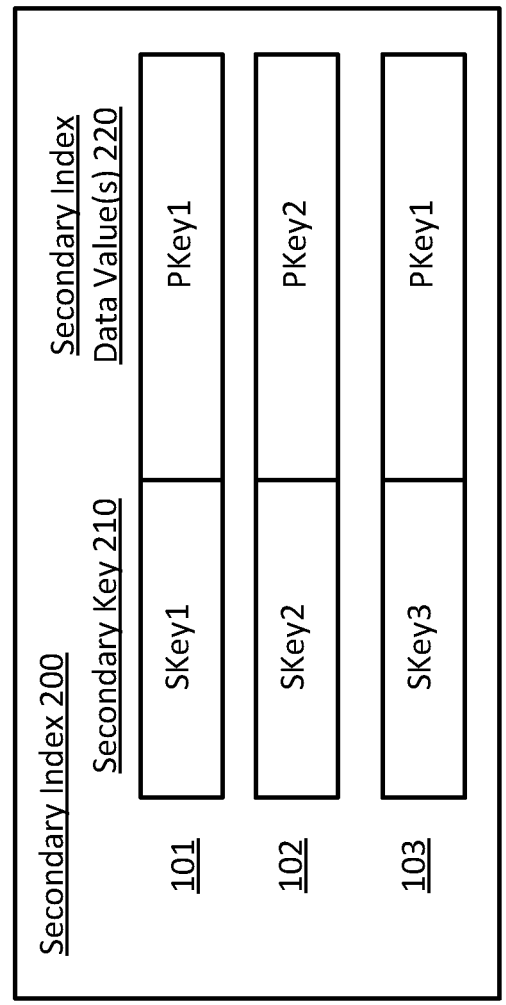
FIG. 2 is an example secondary index as may be used in one embodiment of the present approach.

Referring now to FIG. 2, a simplified example of a secondary index is shown. In this simplified example, secondary index 200 associated with LSM database 100 of FIG. 1 is shown in a tabular or table format where each row comprises a secondary key 210 and a corresponding secondary index data value 220 comprising a primary key 110 of LSM database 100 of FIG. 1. As explained by example above, secondary index 200 associated with LSM database 100 can then be used to search by secondary key 210 to identify one or more relevant primary key 110 of the LSM database 100.

As is known in the art, a secondary index must be updated to reflect updates made to the LSM database to which the secondary index is associated. For example, again using the example of an LSM database containing a list of employees, if a new employee is added to the company or an existing employee's home address has changed, the LSM database is updated with that information according to the processes described above. Then, to continue providing faster search query response times, the secondary index to which the LSM database is associated is also updated to reflect those updates to the LSM database.

In order to update a secondary index, first it must be determined what updates have been made to the LSM database. This is done, as is known in the art, by checking a list of LSM database updates, which list is updated each time an update is made to the LSM database by noting the primary key for that update (it being understood that despite being called a list, any known data structure can be used to perform this function). In this way, when the secondary index is to be updated, it can readily be determined what updates have been made to the LSM database.

Now knowing the primary key for an update made to the LSM database, the next step in updating the secondary index, as is known in the art, is to read each data file in the LSM database having that primary key. As was explained above, because updates to the LSM database do not edit an existing data file and instead simply add a new data file with the updated data value(s), and because the updated information can be new data values or edits to previously existing data values, each data file in the LSM database having that primary key from the list of LSM database updates must be read in order to obtain all of the current data values for that primary key. Then, once having read each data file in the LSM database having that primary key, the secondary index can be updated by writing to the secondary index those current data values for that primary key. This process of first reading each data file in the LSM database having that primary key and then updating the secondary index by writing updated data values to the secondary index is referred to as a secondary index update "read-before-write" operation.

The next step in updating the secondary index, as is known, is to delete any corresponding old entry in the secondary index having that same primary key. This is referred to as a secondary index update "delete" operation.

As is known, performing the secondary index update read-before-write operation and the secondary index update delete operation for each entry in the list of LSM database updates can consume considerable processing and input/output (IO) resources. This is particularly undesirable when, for example, an entry on the list of LSM database updates is for an LSM database update that did not edit or add data values corresponding to an existing primary key. In other words, if a given LSM database update was simply adding a data file with data values that did not change or add to any existing data, then performing the read-before-write and delete operations are unnecessary. This is because there was no existing data file in the LSM database having that primary key, so there was nothing to read, and because there was no corresponding old entry in the secondary index having that same primary key, so there was nothing to delete.

Therefore, the known approach to avoid these unnecessary operations, before attempting any read-before-write and delete operations for an entry in the list of LSM database updates, is to first check what is called a Bloom Filter for each data file in the LSM database. Referring again to FIG. 1, a Bloom Filter exists for each data file in the LSM database. As is known, a Bloom Filter is a space-efficient probabilistic data structure, conceived by Burton Howard Bloom in 1970, that is used to test whether an element is a member of a set. With a Bloom Filter, false positive matches are possible, but false negatives are not. In other words, a query to a Bloom Filter returns either "possibly in set" or "definitely not in set." As such, querying a Bloom Filter for a corresponding given data file in the LSM database indicates that a given primary key is definitely not in the corresponding data file, or alternatively that the primary key is possibly, but not definitively, in the corresponding data file (the latter being a possible false positive query result).

However, in the case of LSM databases containing large numbers of data files, it has been determined that this known approach to querying Bloom Filters is problematic. In such large databases, performing Bloom Filter queries for such large databases results in a probability of false positives of almost 100%. Thus, despite the known approach of querying each Bloom Filter corresponding to each data file in the LSM database, in the hopes of avoiding the read-before-write and delete operations as part of updating the secondary index, instead what occurs with large LSM databases is such a high false positive rate that it essentially guarantees having to perform unnecessary read-before-write and delete operations. For example, it has been mathematically determined that if there are as few as 100 database files in a given LSM database with a Bloom Filter per database file, and the Bloom Filter false positive rate is 3%, the probability of a false positive for a given primary key lookup is already at 95%. Therefore, once a database reaches or exceeds a certain size, most updates render such use of Bloom Filter useless and the operations must still be performed. This size is determinable according to the spreadsheet calculation: 1—POWER (1—false positive rate, number of database files). What will now be described is a new approach that avoids this problem.

Figure 3:
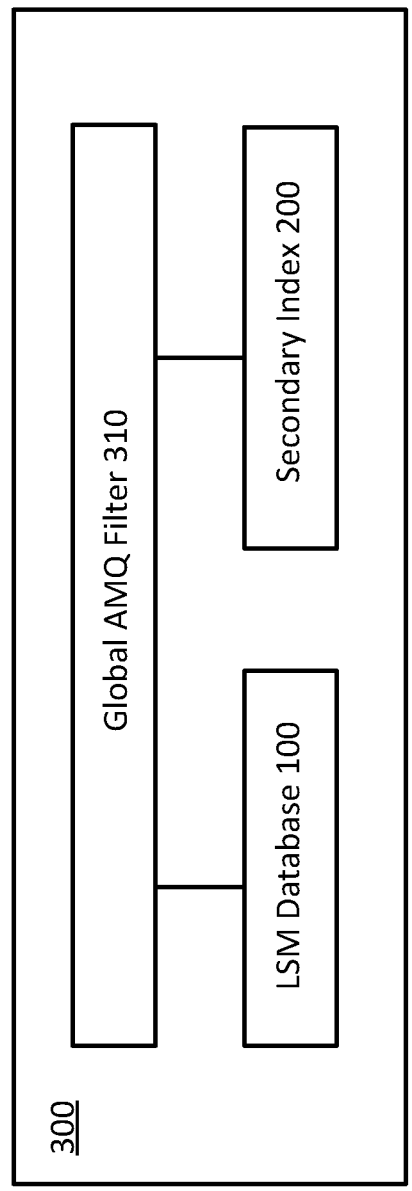
FIG. 3 is an example system according to one embodiment of the present approach.

Referring now to FIG. 3, an exemplary system 300 of the present approach can be seen (it being understood that, as with the example shown in FIG. 1, such system can be stored and run on any of various known computing systems and storage devices). As shown is an LSM database (e.g., LSM database 100 of FIG. 1) comprising a number of data files, each with a corresponding Bloom Filter, a Global Approximate Member Query ("AMQ") Filter 310, as explained further below, and a secondary index (e.g., secondary index 200 of FIG. 2).

In the present approach, when updating the secondary index based on a primary key in the list of LSM database updates, rather than first querying each Bloom Filter corresponding to each data file in the LSM database, the single Global AMQ Filter 310 is first queried to determine whether the primary key in the list of LSM database updates already existed in the LSM database 300 before the addition of that primary key.

If the result of the Global AMQ Filter query is that the primary key in the list of LSM database updates did not already exist in the LSM database before the addition of that primary key, which means that this primary key was newly added to the LSM database, then the read-before-write and delete operations do not need to be performed as part of the secondary index update process, thus avoiding performing considerable unnecessary operations. For example, where N is the number of database files in the LSM database, the present approach reduces the number of such operations from N to 1.

Conversely, if the result of the Global AMQ Filter query is that the primary key in the list of LSM database updates did already exist in the LSM database before the addition of that primary key, which means that this primary key did already exist in the LSM database so there are now multiple data files in the LSM database with that primary key, then the read-before-write and delete operations do need to be performed as part of the secondary index update process as in the known prior approach.

Avoiding the read-before write and delete operations, when it is determined that the primary key in the list of LSM database updates did not already exist in the LSM database, results in a dramatic increase of indexing throughput. Test results have shown a doubling of the indexing performance, which is a significant improvement in operational efficiency of secondary index updates over the known prior approach.

It is to be understood, in light of the teachings herein, that the Global AMQ Filter is a probabilistic filter that is similar to a Bloom Filter in that it too can be used to test whether an element is a member of a set (and is therefore an approximate member query filter). However the Global AMQ Filter is different than the individual Bloom Filters where there is one Bloom Filter corresponding to each data file in the LSM database. Unlike any individual Bloom Filter, the Global AMQ Filter supports the deletion of entries in the Global AMQ Filter. When a primary key is deleted from the LSM database (as occurs during the compaction process), that primary key is also deleted from the Global AMQ Filter to avoid the possibility of false positives when the Global AMQ Filter is later queried. Also unlike any individual Bloom Filter, the Global AMQ Filter can easily be resized without rehashing, it being understood from the teachings herein that resizing of the Global AMQ Filter would occur when the Global AMQ Filter is increased in order to hold one or more additional row of primary keys. By contrast, as known in the art, being allocated a fixed size and written to once, a Bloom Filter neither allows such deletions nor can it easily be resized without rehashing. These differences thus support the present approach of querying a single Global AMQ Filter rather than each of the Bloom Filters corresponding to each of the data files in the LSM database when determining whether the primary key in the list of LSM database updates previously existed in the LSM database.

It is to be understood in light of the teachings herein that the Global AMQ Filter is a probabilistic filter that supports deletes and can easily be resized without rehashing. Example known filters that can be implemented as the Global AMQ Filter include a Quotient Filter and a Cuckoo Filter, however any known filter having the above qualities can be used. For example, as is known in the art, a Quotient Filter can be resized without rehashing the keys because the fingerprints can be recomputed using just the quotients and remainders.

Figure 4:
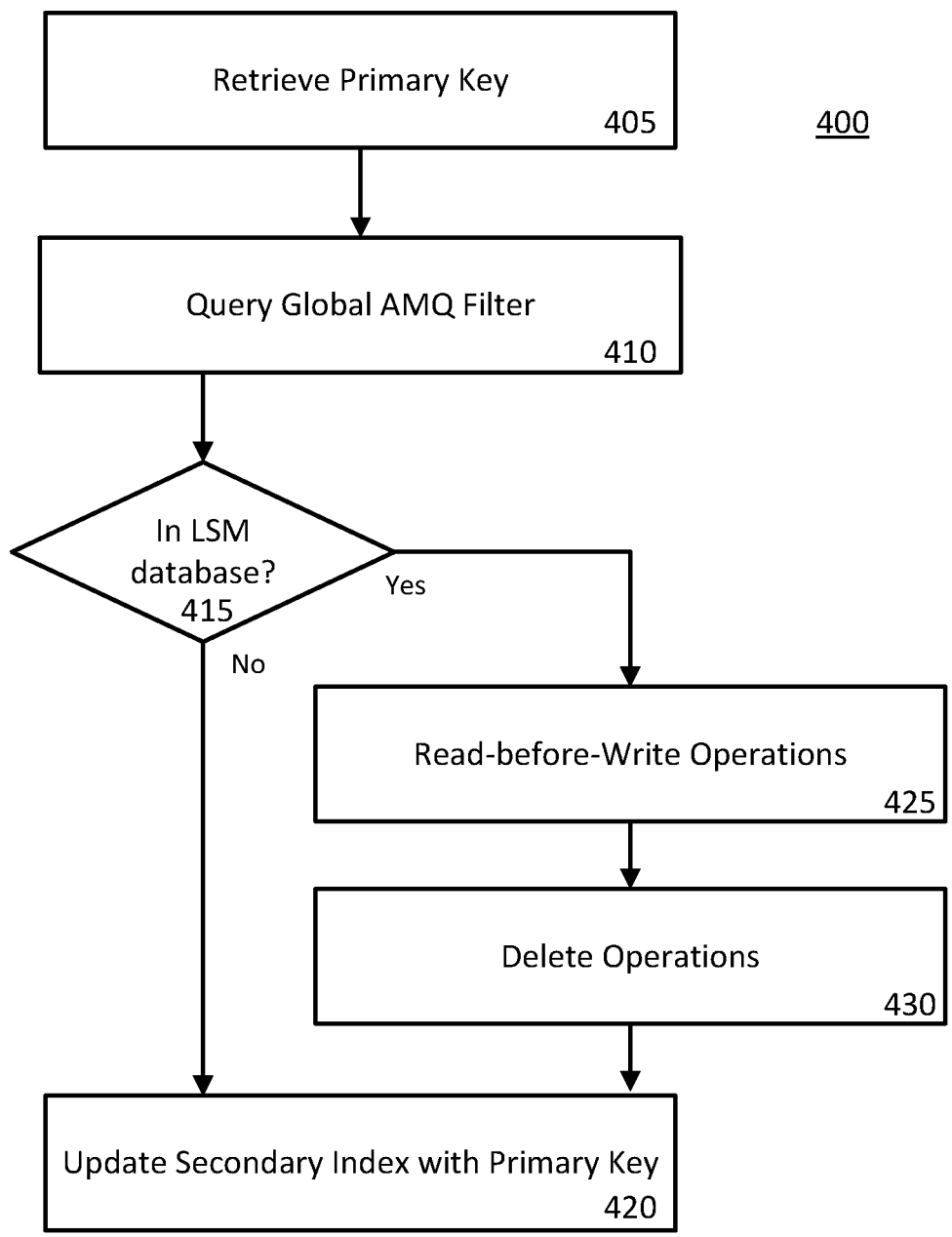
FIG. 4 is an example method according to one embodiment of the present approach.

Referring now to FIG. 4, a flowchart of a method 400 of updating a secondary index according to one embodiment of the present approach can be seen (it being understood that such method can be run or stored on the system of FIG. 3).

In step 405, a primary key is retrieved from the list of LSM database updates.

In step 410, the Global AMQ Filter is queried to determine if the retrieved primary key already exists in the LSM database.

If the result of the query in step 410 is that no, the primary did not already exist in the LSM database, then in step 420 the secondary index is updated with the retrieved primary key along with the accompanying row data existing in memory.

Conversely, if the result of the query in step 410 is that yes, the primary key did already exist in the LSM database, then in steps 425 and 430 the known prior approach of read-before-write operations and delete operations is performed. In particular, as explained above regarding the known prior approach, each Bloom Filter corresponding to each data file in the LSM database is read to locate each data file containing that retrieved primary key, each of those located data files is read from the LSM database, and an entry in the secondary index corresponding to that retrieved primary key is deleted. The process then continues where, in step 420, the secondary index is updated with the retrieved primary key and its corresponding data value.

The disclosed system and method has been explained above with reference to several embodiments. Other embodiments will be apparent to those skilled in the art in light of this disclosure. Certain aspects of the described method and apparatus may readily be implemented using configurations or steps other than those described in the embodiments above, or in conjunction with elements other than or in addition to those described above. It will also be apparent that in some instances the order of steps described herein may be altered without changing the result of performance of all of the described steps.

Further, it should also be appreciated that the described method and apparatus can be implemented in numerous ways, including as a process, an apparatus, or a system. The methods described herein may be implemented by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc., or communicated over a computer network wherein the program instructions are sent over optical or electronic communication links. It should be noted that the order of the steps of the methods described herein may be altered and still be within the scope of the disclosure.

The systems described herein may be implemented on any of a large variety of computing systems configured to perform the described methods and operations, including a single computing device, processor, server, or server farm coupled to a storage device or system, a networked computing device, processor, server, or server farm coupled to one or more storage device or system, and/or a networked set of computing devices, processors, servers, or server farms coupled to one ore more storage device or system.

These and other variations upon the embodiments described and shown herein are intended to be covered by the present disclosure, which is limited only by the appended claims.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method for updating a secondary index associated with a log-structured merge-tree (LSM) database, the method comprising:
   retrieving, by a computing system, a primary key from a list of updates made to the LSM database;
   querying, by the computing system, a Global Approximate Member Query (AMQ) Filter to determine whether the retrieved primary key does or does not already exist in the LSM database;
   updating the secondary index with the retrieved primary key without performing a read-before-write operation or a delete operation on the secondary index, when the result of the query is a determination that the retrieved primary key does not already exist in the LSM database; and,
   updating the secondary index with the retrieved primary key by performing a read-before-write operation and a delete operation on the secondary index, when the result of the query is a determination that the retrieved primary key does already exist in the LSM database.

2. The method of claim 1 wherein the Global AMQ Filter is a probabilistic filter that supports deletes and can be resized without hashing.

3. The method of claim 1 wherein the Global AMQ Filter is a Quotient Filter.

4. The method of claim 1 wherein the Global AMQ Filter is a Cuckoo Filter.

5. A non-transitory computer-readable storage medium having embodied thereon a program, the program being executable by a processor to perform a method for storing an index in working memory of a computing system that can concurrently be searched, the method comprising the steps of:
   retrieving, by a computing system, a primary key from a list of updates made to the LSM database;
   querying, by the computing system, a Global Approximate Member Query (AMQ) Filter to determine whether the retrieved primary key does or does not already exist in the LSM database;
   updating the secondary index with the retrieved primary key without performing a read-before-write operation and a delete operation on the secondary index, when the result of the query is a determination that the retrieved primary key does not already exist in the LSM database; and,
   updating the secondary index with the retrieved primary key by performing a read-before-write operation and a delete operation on the secondary index, when the result of the query is a determination that the retrieved primary key does already exist in the LSM database.

6. The non-transitory computer-readable storage medium having embodied thereon a program of claim 5, wherein the Global AMQ Filter is a probabilistic filter that supports deletes and can be resized without hashing.

7. The non-transitory computer-readable storage medium having embodied thereon a program of claim 5, wherein the Global AMQ Filter is a Quotient Filter.

8. The non-transitory computer-readable storage medium having embodied thereon a program of claim 5, wherein the Global AMQ Filter is a Cuckoo Filter.

9. A computing system for updating a secondary index associated with a log-structured merge-tree (LSM) database, the computing system comprising:

a processor, a Global Approximate Member Query (AMQ) Filter, the LSM database, a list of updates made to the LSM database, and the secondary index;
wherein the processor is configured to:
retrieve a primary key from a list of updates made to a LSM database;
query the Global AMQ Filter to determine whether the retrieved primary key does or does not already exist in the LSM database;
update the secondary index with the retrieved primary key without performing a read-before-write operation or a delete operation on the secondary index, when the result of the processor query is a determination that the retrieved primary key does not already exist in the LSM database; and,
update the secondary index with the retrieved primary key by performing a read-before-write operation and a delete operation on the secondary index, when the result of the processor query is a determination that the retrieved primary key does already exist in the LSM database.

10. The computing system of claim 9 wherein the Global AMQ Filter is a probabilistic filter that supports deletes and can be resized without hashing.

11. The computing system of claim 9 wherein the Global AMQ Filter is a Quotient Filter.

12. The computing system of claim 9 wherein the Global AMQ Filter is a Cuckoo Filter.

* * * * *